United States Patent [19]

Kilayko

[11] Patent Number: 4,781,213
[45] Date of Patent: Nov. 1, 1988

[54] BALL CHECK VALVE

[76] Inventor: Enrique L. Kilayko, 64 Arrowhead Rd., Weston, Mass. 02193

[21] Appl. No.: 120,853

[22] Filed: Nov. 16, 1987

[51] Int. Cl.⁴ .................... F16K 15/04; F16K 25/00
[52] U.S. Cl. .................. 137/516.29; 137/516.27; 137/533.15; 251/361; 251/363
[58] Field of Search .............. 137/516.25, 516.27, 137/516.29, 533.11, 533.15, 539, 539.5; 251/361, 362, 363, 900

[56] References Cited

U.S. PATENT DOCUMENTS

| | | | |
|---|---|---|---|
| 2,409,220 | 10/1946 | Melichar et al. | 251/362 X |
| 2,481,460 | 9/1949 | Williams | 251/363 X |
| 2,790,460 | 4/1957 | Radd | 137/533.15 |
| 3,131,718 | 5/1964 | Mingrone | 137/516.29 X |
| 3,327,635 | 6/1967 | Sachnik | 137/533.15 X |
| 3,346,008 | 10/1967 | Scaramucci | 137/533.15 X |
| 4,197,875 | 4/1980 | Schieferstein et al. | 137/533.11 |
| 4,408,632 | 10/1983 | Kent | 137/516.29 |

FOREIGN PATENT DOCUMENTS

| | | | |
|---|---|---|---|
| 538842 | 6/1959 | Belgium | 137/533.15 |
| 1550530 | 10/1969 | Fed. Rep. of Germany | 137/533.15 |
| 940594 | 10/1963 | United Kingdom | 137/516.29 |

Primary Examiner—John Rivell
Attorney, Agent, or Firm—Sylvia L. Boyd

[57] ABSTRACT

A ball check valve assembly for chemical pumps. A fluid conduit terminates at a first surface in a port of circular cross section. Within the conduit, an O ring seat is aligned with the port; an elastomeric O ring is positioned in the seat. Spacer means, radially outward of the O ring seat, extends generally away from the port and has a dimension adjacent the O ring seat greater than the cross sectional diameter of the O ring when unstressed. O ring capture means spaced from the O ring seat limits travel of the O ring away from the port, and provides a central aperture for the valve ball, which has a diameter greater than that of the port. The O ring has an ID less than the diameter of the ball and an OD greater than the diameter of the aperture; the spacer means ID is at least about ½% greater than the OD of the O ring. During closing travel of the ball, the O ring is free to move transverse to the direction of such travel responsive to the ball, for impact on the O ring distributed relatively equally over the contacted surface.

5 Claims, 2 Drawing Sheets

BALL CHECK VALVE

BACKGROUND OF THE INVENTION

The invention is an improved ball check valve, for use particularly in chemical metering pumps. Such pumps deliver fluid against pressure differentials ranging from almost zero to about 300 psi; the pumped fluid may be corrosive, solvent or oxidizing. Such pumps typically operate in manufacturing environments where they may be subject to impact; the valves must operate reliably over a large number of cycles, typically tens of millions. The valves are generally the first elements of such a pump to wear, and therefore must be designed to be both durable in use and relatively easy to replace in the field, by mechanics or other personnel who may be unfamiliar with the valve construction.

Many designs of such valves have been used; the present invention relates to a ball check valve. A ball check valve basically comprises a fluid port of circular cross section and a spherical closure element or ball which in a first direction of fluid flow (as during the pressure stroke) floats away from the port, permitting flow, and in a second direction of flow (as during the suction stroke) seats in the port, stopping flow. The port and ball are contained within a valve body, which generally comprises at least two parts which are secured together as by mating screw threads, permitting assembly of the valve or replacement as needed.

In such a valve two fluid paths must be interrupted by seals: first, the path of desired flow of the fluid being pumped (fluid path) which is alternately sealed and unsealed during the pump operating cycle; second, the path of leakage from the fluid path through the interface between the valve body parts (leakage path) which is desirably sealed at all times. The fluid path is sealed by the ball and port; the leakage path is primarily sealed by mutually tightening the two valve body parts; ancillary sealing means such as an O ring may be used to improve this seal.

In practice various difficulties are found with such valves. To withstand the forces exerted over many cycles of operation, and also to resist the destructive action of the pumped fluid, the ball and port are typically made of hard substances such as metal or ceramic, and unless finished, for example by machining, to extremely close tolerances will not seal completely to one another. Such precise finishing adds to the manufacturing cost of the valve. To avoid the need for such finishing, therefore, an additional resilient seat element such as an elastomeric O ring is typically employed between the port and the ball to provide a resilient valve seat, which accommodates to irregularities in the ball or in the port surface on which it is supported, as well as to any misalignment between ball and port.

A problem with the use of such a resilient seat element has been that when compressed against a supporting surface that is not adequately flat, the seat element, being elastomeric, tends to conform with any excursions in the surface and therefore is distorted and fails to seal completely against the ball. The supporting surface is therefore desirably provided by a relatively hard element; such hard material is often finished to provide the accurate supporting surface, but such finishing is a relatively expensive method of manufacture. Moreover there are problems of sealing the leakage path past such element.

A further problem with the use of such seat elements has been that when the pump operates across a low pressure differential, at the end of the pressure stroke there is only a small force urging the ball to seat in the port. It is therefore particularly important that the ball seat accurately and completely against the resilient seat element even under low pressure. However the ball, urged toward the valve seat by the back pressure of the fluid, does not move along a well defined path; hence the position at which it first contacts the seat element is not predictable. Sealing may not be rapid, permitting excessive back flow or "slippage", and complete sealing may not even be attained.

In some ball check valve applications, springs have been employed to assist the seating of the ball; however, because of the corrosive nature of the fluid pumped by chemical metering pumps, such springs are generally unsatisfactory in this environment. A resistant coating on the spring not merely increases its cost, but also tends to make the spring stiffer, bulkier and less functional. Therefore some other means must be found to provide for rapid and accurate seating of the ball even at very low pressure. At the same time, the valve design must permit the ball to move sufficiently away from the port to provide adequate flow area.

Undesirable distortion of the seal element may also result from axial and tangential forces exerted as the housing parts are mutually tightened. Such a distortion tends to degrade the function of the seal element.

It is therefore desirable to provide a ball check valve assembly suitable for use in the demanding chemical metering pump environment, in which the movable closure element reliably seats itself rapidly and accurately against the resilient seat element over a range of differential pressures from zero or almost zero through at least 300 psi, while at the same time the leakage path is reliably sealed off. It is an object of the present invention to provide such a ball check valve assembly which is inexpensive to manufacture, has relatively few and simple parts, and is easily positioned for use or removed and replaced.

BRIEF SUMMARY OF THE INVENTION

The invention provides a ball check valve assembly for use in a valve body comprising a base and a housing securable together. The assembly comprises a subassembly providing a first surface; an assembly fluid conduit terminates at the first surface in a port of circular cross section for communication with a base fluid conduit in the base. Within the assembly fluid conduit, an O ring seat is aligned with the port; an elastomeric O ring is positioned in the seat. Spacer means, radially outward of the O ring seat, extends generally away from the first surface and has a dimension adjacent the O ring seat greater than the cross sectional diameter of the O ring when unstressed.

The assembly further comprises O ring capture means spaced from the O ring seat for limiting travel of the O ring away from the port, and providing a central aperture; and a rigid spherical valve closure element having a diameter greater than that of the port. The O ring has an ID less than the diameter of the closure element and an OD greater than the diameter of the capture means aperture; the spacer means ID is at least about ½% greater than the OD of the O ring. During closing travel of the closure element, the O ring is free to move transverse to the direction of such travel responsive to the closure element, for impact on the O ring distributed relatively equally over the contacted O ring surface.

Further objects, features, and advantages will appear from the following description of a preferred embodiment, together with the drawing, in which:

DETAILED DESCRIPTION OF THE INVENTION

Figure 1:
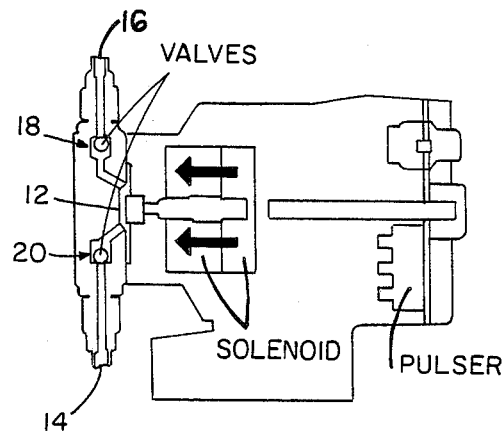
FIG. 1 is a schematic showing of a chemical metering pump of the kind in which the valve of the present invention is employed.

Referring now to the drawing, and in particular to FIG. 1, in a chemical metering pump 10 a diaphragm 12 is employed to pump fluid from a source connected at inlet 14 to an outlet 16. Two ball check valves 18 and 20 are employed in pump 10.

Figure 2:
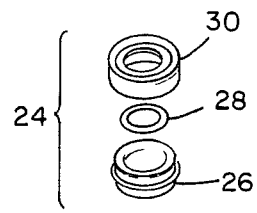
FIG. 2 is a simplified exploded perspective view of the elements of a subassembly of the invention.

The ball check valve assembly 22 (FIG. 3) of the present invention comprises a subassembly 24 together with a movable closure element in the form of a ball 25. In FIG. 2 the three elements of subassembly 24 are seen in simplified form, namely an insert 26, an O ring 28 and a retainer 30.

Figure 3:
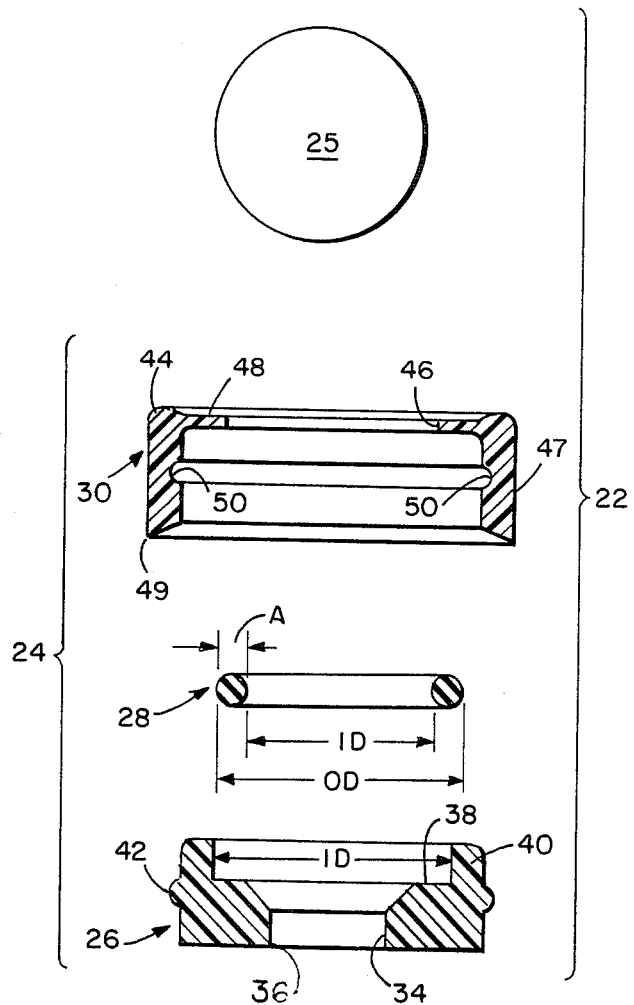
FIG. 3 is a cross section of the elements of the valve assembly of the invention.

Insert element 26 is relatively hard compared with the retainer and O ring, and is molded of an injection moldable thermoplastic. In a particular embodiment element 26 is made of glass fiber reinforced polypropylene. Alternatively it may be made of carbon reinforced PVDF (poly-vinylidine fluoride) or of glass fiber reinforced polyphenylene sulfide. Referring now to FIG. 3, insert 26 provides a first surface 32; an insert fluid conduit 34 terminates a surface 32 in a port 36 of circular cross section, for communication with a fluid conduit in pump 10. Spaced from and axially aligned with port 36 is a relatively flat annular O ring seat surface 38. A cylindrical spacer 40 surrounds seat surface 38. A retaining ridge 42 is provided on the exterior of insert element 26.

O ring 28 is made of any suitable elastomeric material, in the described embodiment having a Shore A durometer of about 80. The ID of spacer 40 is at least ½ percent greater than the OD of O ring 28. In the described embodiment, the difference is at least about 0.002 inch and may be as much as 0.015 inch.

Retainer 30 is made of an elastomeric material, desirably of about the same hardness as the material of O ring 28. In the described embodiment the material of retainer 30 has a Shore A durometer of about 80. Retainer 30 provides a bearing surface 44 disposed for sealing contact with the valve body housing when the valve is in operating position in a pump. Adjacent to bearing surface 44, and in the described embodiment formed integrally with it, is O ring capture means 48. Capture means 48 is a thin annular portion of retainer 30 which defines an aperture 46; aperture 46 is large enough to admit ball 25 into valve closing position with respect to port 36 but not large enough to permit O ring 28 to move through it away from port 36.

Retainer 30 provides a cylindrical sealing wall 47, tapered to an edge 49. The interior surface of retainer sealing wall 47 provides a recess 50 adapted to engage with ridge 42 of insert 26.

In the described embodiment, ball 25 is made of ceramic; the diameter of ball 25 is 0.375 inch; the O ring ID is 0.300 inch, its cross section (shown as "A" in FIG. 3) is 0.070 inch, and its OD is 0.440. The ID of spacer 40 is 0.442 inch; the diameter of aperture 46 is 0.400 inch. The diameter of port 36 is 0.210 inch, but in some designs may be as large as the O ring ID, as will be described below.

Referring now to FIG. 3, subassembly 24 is assembled by placing O ring 28 onto seat surface 38 of insert 26. O ring 28 is dimensioned to fit relatively loosely within insert 26. Thereafter retainer 30 is fitted over insert 26, and snapped over insert ridge 42 which engages retainer recess 50. O ring 28 is then retained by capture means 48 in close proximity to port 36.

Figure 5:
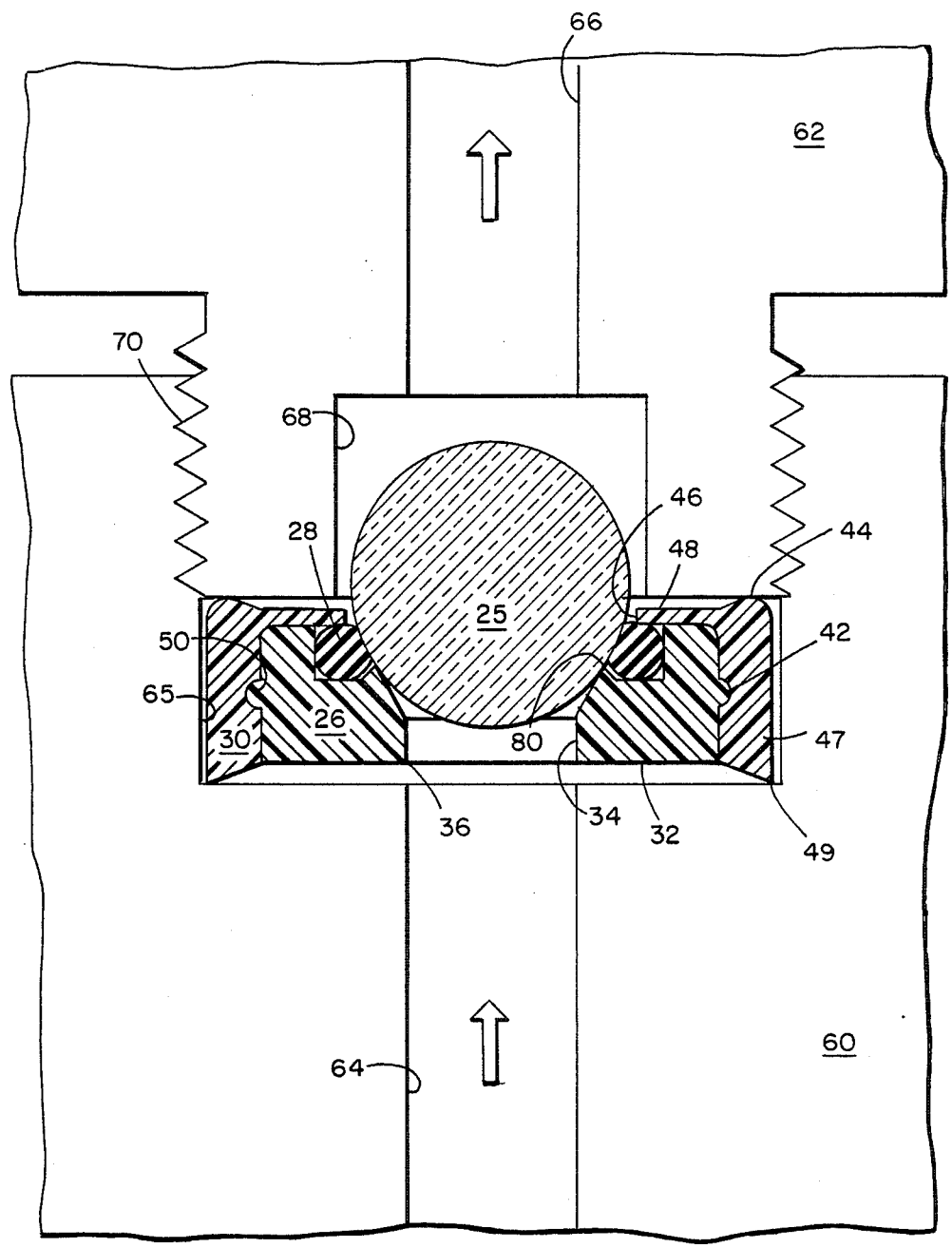
FIG. 5 is a cross section of the valve assembly of the invention as employed in a chemical metering pump.

As seen in FIG. 5, the valve assembly of the invention is typically positioned in a valve body comprising a base 60 and a housing 62. Base 60 provides base fluid conduit 64 terminating in a retainer chamber 65; housing 62 provides housing fluid conduit 66, which terminates in ball chamber 68. Flow is in the direction of the arrows in FIG. 5. Base 60 and housing 62 are secured together by the relative tightening of cooperating screw threads as at 70. Other features of the base and housing are not relevant to the present invention.

Valve subassembly 24 of FIG. 3 is positioned in the valve body of FIG. 5 to bring port 36 into communication with base fluid conduit 64. Base fluid conduit 64, insert fluid conduit 34, ball chamber 68 and housing fluid conduit 66 together comprise a fluid path for the fluid being pumped. It will be seen that a first leakage path runs from base fluid conduit 64 around valve subassembly 21 and out between threads 70, and that another leakage path runs from housing fluid conduit 66 around subassembly 21 and out between threads 70.

O ring 28 is captured between insert surface 38 and retainer capture means 48, which limits any substantial movement of the O ring away from port 36. However, because the ID of spacer 40 is greater than the OD of O ring 28, the O ring has limited freedom to move transverse to the valve axis; the O ring is free to float. During closing action by ball 25, as the ball moves toward port 36 it tends to bring O ring 28 into alignment with the ball, so that contact is made over an extended part of the O ring surface and sealing pressure is exerted relatively evenly over the O ring. As a result of this feature, even at low pressure differential, ball 25 seals effectively against the O ring. Such aligning and sealing is effected even if housing 62 and base 60 are not themselves perfectly aligned.

The design of the valve assembly according to the present invention makes the manufacture of the valve inexpensive. The O ring is retained between insert seat surface 38, spacer 40, and retainer capture means 48, rather than in an undercut capture structure such as is conventionally provided. It is therefore not necessary to finish or machine insert 26, which can instead be molded, contributing to the economy of manufacture. Because of the self centering feature, valve body parts 60 and 62 need not be as accurately centered with respect to each other as would otherwise be the case. In addition, the flatness of surface 38 and the smoothness of the inner surface of spacer 40 are less critical than would be the case with an O ring which was not free to float; molding therefore provides satisfactory quality.

In assembly, as housing 62 is tightened with respect to base 60, pressure is exerted on bearing surface 44 of retainer 30; surface 44 provides a first seal of the leakage path, preventing fluid from housing conduit 66 from reaching threads 70. Such pressure further causes retainer sealing wall 47, supported on insert 26, to bulge outwardly of axis 67, and to force edge 49 downwardly against base 60. Wall 47 and its edge 49 thereby seal off the leakage path, preventing fluid from base conduit 64 from reaching threads 70. Because of the relatively large amount of elastomeric material in retainer 30, and because of its relatively large surface area, an effective leakage seal is provided even if the retainer chamber 65 is not perfectly round or its interior walls perfectly smooth. At the same time, since insert 26 supports retainer 30, the pressure of housing 62 against bearing surface 38 of retainer 30 is not transmitted to O ring 28. The degree of tightening between housing 62 and base 60 is therefore not critical and no great degree of skill is required to accomplish this step.

Figure 4:
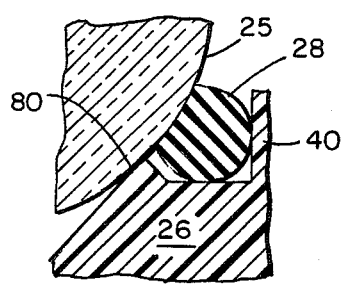
FIG. 4 shows a detail of the valve assembly of the invention.

It has been found that there is a limit pressure depending on dimensions, at which the force of ball 25 sealing against O ring 28 effectively compresses the O ring to a limit. For the dimension in the given example, such limit pressure is about 100 psi. Repeated compression beyond this limit reduces O ring. To limit distortion of the O ring, and thus to prevent undue wear, it is desirable that the O ring be protected from compression to this limit value. For this purpose, as seen in FIG. 4, in the described embodiment a ball stop surface 80 is provided at the interior margin of insert seat surface 38. Stop surface 80 is molded integrally with insert 26. When urged by a pressure of 100 psi or more, ball 25 seats against stop surface 80, thereby preventing the O ring from being compressed beyond this limit. To provide such stop surface, the diameter of port 36 must be smaller than the ID of O ring 28; however, for applications in which the support edge is not needed, it may be omitted and the port may be as large as the O ring ID. The exact position of stop surface 80 is determined for any particular design from a consideration of the O ring dimensions and elastomeric characteristics, the dimensions of the ball, and the operating pressures.

The valve subassembly of the invention comprises only three elements, none of which requires machining and none of which needs to be manufactured to close tolerances. The three elements are of simple design and are easily assembled together to form the subassembly, which is therefore relatively inexpensive to manufacture. The assembly (including ball 25) is easily assembled to a valve body, and will fit a range of valve bodies of varying designs and forms. When worn, the assembly is easily removed and replaced. Because of the free-to-float feature, effective sealing and minimal "slippage" is provided by the valve over a range of pressure differentials, including the condition of a pressure differential of close to zero, while leakage is effectively prevented. The valve operates satisfactorily in retainer chambers that are less then perfectly smooth and cylindrical, and the effective sealing is provided without critical alignment of the housing and base.

What is claimed is:

1. A ball check valve assembly for use in a valve body comprising a base and a housing securable together, comprising
    a subassembly providing
        a first surface,
        an assembly fluid conduit terminating at said first surface in a port of circular cross section for communication with a base fluid conduit in the base,
        within said assembly fluid conduit, an O ring seat aligned with said port,
        an elastomeric O ring positioned in said seat,
        spacer means radially outward of said O ring seat, extending generally away from said first surface and having a dimension adjacent said O ring seat greater than the cross sectional diameter of said O ring when unstressed, and
        O ring capture means spaced from said O ring seat for limiting travel of said O ring away from said port, providing a central aperture, and
    a rigid spherical valve closure element having a diameter greater than that of said port,
    said O ring having an ID less than the diameter of said closure element and an OD greater than the diameter of said capture means aperture,
    said spacer means ID being at least about $\frac{1}{2}$% greater than the OD of said O ring,
    whereby during closing travel of said closure element, said O ring is free to move transverse to the direction of such travel responsive to said closure element, for closure element impact on said O ring distributed relatively equally over the contacted O ring surface.

2. The assembly of claim 1, wherein
    said subassembly further provides an elastomeric bearing surface supported on said spacer means and disposed for leakage sealing contact with the valve body housing, whereby in use said spacer is disposed for transmission of normal and tangential force exerted on said bearing surface by the valve body housing to the base and not to said O ring.

3. The assembly of claim 2, wherein
    said subassembly further provides an elastomeric sealing wall contiguous with said bearing surface and disposed for leakage sealing contact with the valve body base.

4. A ball check valve assembly for use in a valve body comprising a base and a housing securable together by mating screw threads, said assembly comprising
    a rigid spherical valve closure element, and
    a subassembly comprising
        an elastomeric O ring, an elastomeric retainer, and an insert element relatively rigid with respect to said O ring and retainer,
        said insert element providing
            a first surface,
            an assembly fluid conduit terminating at said first surface in a port of circular cross section for communication with a base fluid conduit in the base,
            within said assembly fluid conduit, an O ring seat surface aligned with said port, and
            a spacer portion radially outward of said seat and extending generally away from said first surface, having a dimension adjacent said seat greater than the cross sectional diameter of said O ring when unstressed,
        said retainer providing
            a bearing surface spaced from said port and disposed for sealing contact with the valve body housing, O ring capture means adjacent said bearing surface for limiting travel of said O ring away from said port, providing a central aperture, a generally cylindrical sealing wall adjacent said bearing surface and aligned with said retainer, said insert element being retained within said retainer, and said O ring being retained by said seat surface, said spacer, and said capture means, said capture means aperture diameter being great enough to admit said closure element into sealing position with respect to said port, said O ring having an ID less than the diameter of said closure element and an OD greater than that of said capture means aperture, and said seat surface having an OD at least about ½% greater than the OD of said O ring, whereby in use said O ring moves transverse to the direction of travel of said closure element responsive to such travel, for closure element impact on said O ring distributed relatively equally over the contacted O ring surface for a range of closure element travel paths, said bearing surface and said sealing wall being effective to seal against leakage of fluid outwardly of said valve body.

5. The ball check valve assembly of claim 4, wherein said O ring is susceptible to being compressed to a limit by said valve closure element during valve operation at a limit pressure, and said O ring seat surface provides at its inward margin a ball stop surface sized and positioned to be impacted by said valve closure element during valve operation at the limit pressure, whereby said O ring is prevented from being compressed beyond its limit.

* * * * *

UNITED STATES PATENT AND TRADEMARK OFFICE
CERTIFICATE OF CORRECTION

PATENT NO. : 4,781,213
DATED : Nov. 1, 1988
INVENTOR(S) : Enrique L. Kilayko

It is certified that error appears in the above-identified patent and that said Letters Patent are hereby corrected as shown below:

col. 3 line 42:   "a surface" should be --at surface--;

col. 5 line 28:   "O ring." should be --O ring life.--;

col 5 line 37:    "beyong" should be --beyond--.

Signed and Sealed this

Eighteenth Day of April, 1989

Attest:

DONALD J. QUIGG

Attesting Officer

Commissioner of Patents and Trademarks